United States Patent [19]

Harris

[11] Patent Number: 4,907,504

[45] Date of Patent: Mar. 13, 1990

[54] APPARATUS FOR REPOSITIONING CONTAINERS

[75] Inventor: Kenneth R. Harris, Byfield, Mass.

[73] Assignee: Imtran Industries, Inc., Rowley, Mass.

[21] Appl. No.: 204,203

[22] Filed: Jun. 8, 1988

[51] Int. Cl.[4] .................... B41F 17/22; B65G 47/91

[52] U.S. Cl. .................... 101/40.1; 198/409; 198/468.4; 198/346.2; 198/463.4; 294/115

[58] Field of Search .................... 101/38.1, 39, 40, 40.1; 198/409, 468.2, 468.4, 346.2, 463.4; 414/226; 294/115

[56] References Cited

U.S. PATENT DOCUMENTS 3,159,100 12/1964 Marquiss .................... 101/40
3,207,286 9/1965 Cozzoli .................... 198/409
4,176,598 12/1979 Dubuit .................... 101/40.1
4,304,180 12/1981 Lala et al. .................... 101/40
4,352,326 10/1982 Kammann .................... 101/40.1 X
4,712,474 12/1987 Moter .................... 101/40.1
4,763,773 8/1988 Kawarabashi et al. .................... 198/409
4,787,310 11/1988 Tiemann .................... 101/40

FOREIGN PATENT DOCUMENTS 2808598 8/1978 Fed. Rep. of Germany .................... 101/40
69152 6/1977 Japan .................... 294/115

*Primary Examiner*—Clifford D. Crowder
*Attorney, Agent, or Firm*—Fish & Richardson

[57] ABSTRACT

Apparatus for moving a container from a first container position to a second container position in which the container is spaced from the first position and in a different orientation, the apparatus including a drive member that is rotatable about a first axis between a first drive member position and a second drive member position, the first axis being spaced from the first container position, and a gripper for gripping the container, the gripper being rotatably mounted on the drive member about a second axis that is transverse to the first axis and rotates with the drive member, the gripper being rotatable between a first gripper position and a second gripper position, a container engaged by the gripper being in the first container position when the drive member and gripper are in their respective first positions and in the second container position when the drive member and gripper are in their respective second positions.

17 Claims, 4 Drawing Sheets

APPARATUS FOR REPOSITIONING CONTAINERS

BACKGROUND OF THE INVENTION

The invention relates to apparatus for moving a container from a first position to a second position, e.g., in a screen printing machine where a container is moved from a first horizontal printing position to a second vertical position spaced from the printing position.

In machinery for manufacturing containers, the containers are often moved either manually or automatically from one position to another position in the manufacturing process. For example, in a screen printing machine in which printing and ornamentation are printed on a bottle surface, an unprinted bottle having a generally cylindrical surface is brought into a horizontal printing position underneath a screen printing tray, and the bottle is rotated as the printing tray moves horizontally, bringing different portions of the bottle surface into contact with the printing tray. The printed bottle is then moved out of the printing position and is replaced by the next unprinted bottle. The printed bottle is typically placed either on a belt in a vertical position or in a basket in a horizontal position and passed through an oven.

In some prior screen printing machines, bottles have been automatically fed from a delivery chute to the horizontal print position and automatically discharged to horizontally moving baskets. In some less-expensive screen printing machines, the bottles have been manually fed into the horizontal print position and manually removed and placed in a vertical position for transport to an oven. Bottle grippers used in automatic apparatus engage the bottles by members that are inserted into the bottle openings.

SUMMARY OF THE INVENTION

It has been discovered that a container can be desirably moved from a first container position to a second container position by employing a drive member that is rotatable about a first axis between first and second drive member positions and a container gripper that is mounted on the drive member for rotation between first and second gripper positions about a second axis that is transverse to the first axis and rotates with the drive member. Primary rotation of the drive member about the first axis and secondary rotation of the gripper about the second axis cause the container to be moved out of the first position so that the next container can be moved into the first position and also cause the container to be moved into a desired orientation in the second position.

In preferred embodiments the apparatus is employed with printing apparatus that includes a horizontal printing stage for printing the container when in the first position; the primary rotation of the drive member is caused by a first primary gear that is connected to the drive member for rotation with it and a second primary gear that drives the first primary gear; the secondary rotation of the gripper with respect to the drive member is caused by a first secondary gear that is connected to the gripper for rotation with it and a second secondary gear that drives the first secondary gear; the drive member is pivotal about a fixed shaft that carries the second secondary gear; and the gripper includes jaws that can be retracted along an axis parallel to the second axis in order to provide clearance between the jaws and a second container moved into the first position.

In another aspect the invention features a container gripping apparatus that includes a central member and two outer members carrying opposing jaws for gripping the container. The outer members are connected to the central member by parallelogram linkages and are moved first outward and then inward toward each other into a gripping position as they are moved upward with respect to the central member.

In preferred embodiments the outer members are moved by a pneumatic cylinder that is carried by the central member and has a plunger that is connected to the outer members by pivotal links.

In another aspect the invention features loading a container into a first container position using a rotatable container feeder simultaneously with moving another container from the first container position to a second container position using a gripper that is connected to the feeder for rotation about the same axis as the feeder.

In preferred embodiments a delivery chute feeds the containers, and the feeder has a trough with vacuum engagement apertures and a curved shield to prevent discharge of containers from the chute while a container is being moved by the feeder.

Other advantages and features of the invention will be apparent from the following description of a preferred embodiment thereof and from the claims.

DESCRIPTION OF THE PREFERRED EMBODIMENT

The preferred embodiment of the invention will now be described. Drawings

STRUCTURE

Figure 1:
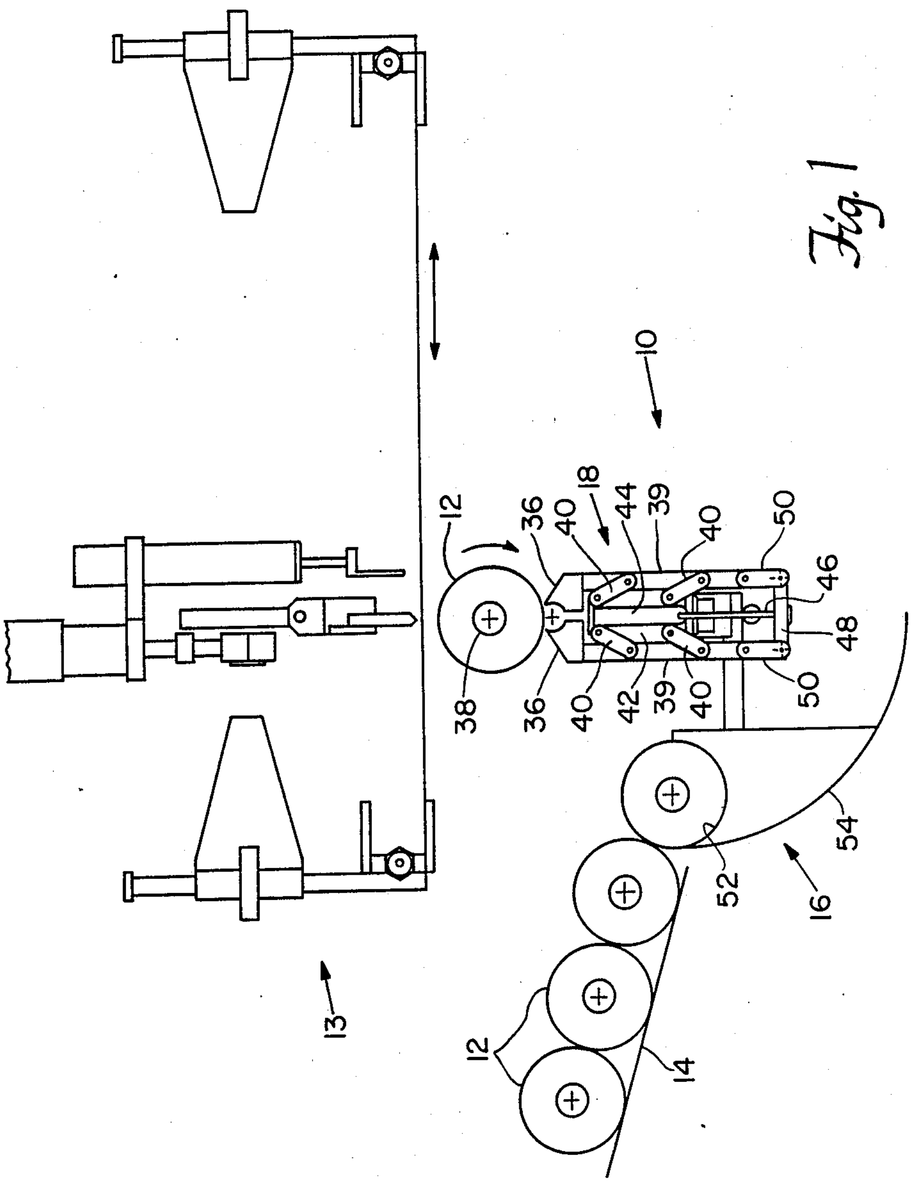
FIG. 1 is a diagrammatic front elevation of a portion of a bottle printing apparatus and a transport apparatus for moving containers from a first container position to a second container position according to the invention.
Figure 2:
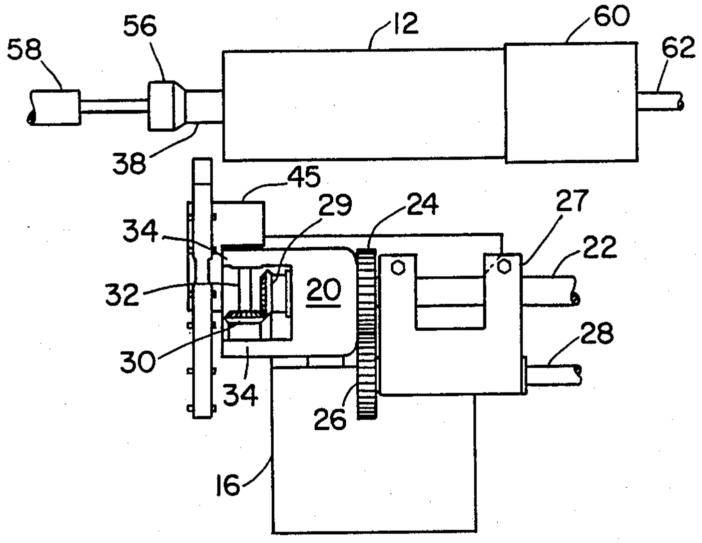
FIG. 2 is a diagrammatic side elevation of the FIG. 1 transport apparatus.

Referring to FIGS. 1 and 2, bottle positioning apparatus 10 is used to load and unload bottles 12 into a first container position for printing by stage 13 of a silk screen printer. Apparatus 10 includes inclined delivery chute 14, rotary bottle feeder 16, and bottle gripper 18. Referring to FIG. 2, rotary feeder 16 is directly connected to drive member 20, which is mounted for primary rotation about the axis (the "first axis") of fixed shaft 22 supported on a machine housing (not shown). First primary gear 24 is secured to drive member 20 for rotation with it about shaft 22. Bracket 27 is fixedly secured to shaft 22 and carries at its lower end rotatable drive shaft 28, having second gear 26 mounted thereon in engagement with first primary gear 24. Gripper 18 is mounted for secondary rotation about the axis (the "second axis") of gripper shaft 32, which is rotatably mounted on drive member 20 between its arms 34 and carries first secondary gear 30. Second secondary gear 29 is mounted at the end of fixed shaft 22 to cause first secondary gear 30 to be driven as drive member 20 rotates.

Referring to FIG. 1, gripper 18 includes opposing jaws 36 for engaging neck 38 of bottle 12. Jaws 36 are mounted on the upper ends of outer members 39, which are linked by pivotal links 40 to central member 42, secured via extension 45 (FIG. 2) to shaft 32. Links 40 and outer members 39 form parallelogram linkages with central member 42. Carried on central member 42 is pneumatic cylinder 44, having a downwardly directed plunger 46 connected to horizontal connector 48 and links 50, pivotally connected to outer members 39.

Rotary feeder 16 includes trough 52 for receiving bottles 12 therein and a curved shield 54 having a radius of curvature about the axis of shaft 22 (about which feeder 16 and drive member 20 rotate) to prevent bottles 12 on chute 14 from moving as feeder 16 is rotated into position. The surface of trough 52 conforms to the shape of the body of bottle 12 and has apertures through which a vacuum is applied to hold a bottle 12 in position.

Referring to FIG. 2, it is seen that bottle 12 is engaged by nose cone 56, which is movable into position by pneumatic actuator 58, and by chuck 60, which is rotated via drive shaft 62 in synchronism with linear motion of printing stage 13 via a rack and gear mechanism (not shown). Operation In operation, bottles on delivery chute 14 are engaged by rotary feeder 16 and are moved into a first print position underneath print stage 13. At print stage 13 nose cone 56 is moved into engagement with neck 38 of bottle 12. Bottle 12 is rotated via chuck 60 in synchronization with linear motion of print stage 13; during these motions printing and other ornamentation are applied to the cylindrical surface of bottle 12.

Figure 3:
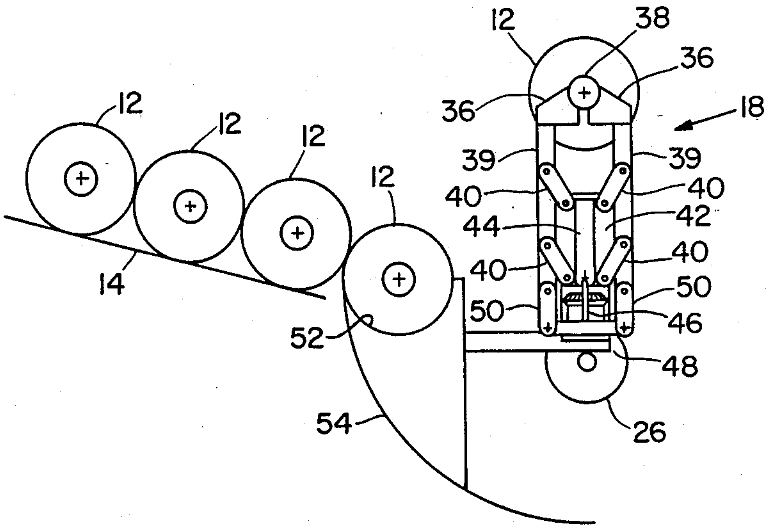
FIG. 3 is a diagrammatic front elevation of the FIG. 1 transport apparatus shown engaging a container in a first container position.

Gripper 18 is then actuated to engage bottle 12. Pneumatic cylinder 44 causes its plunger 46 to be moved upward. This causes outer members 39 to initially move outward and upward while links 40 swing up to a horizontal position. Further upward movement of plunger 46 causes outer members 39 and jaws 36 thereon to continue to move upward and inward as arms 40 move from a horizontal position to a position about 60° further upward, as is shown in FIG. 3. Jaws 36 engage neck 38 in substantially horizontal motions against each other, thus engaging bottle 12 without significant movement of it. Nose cone 56 and chuck 60 are then retracted.

Figure 4:
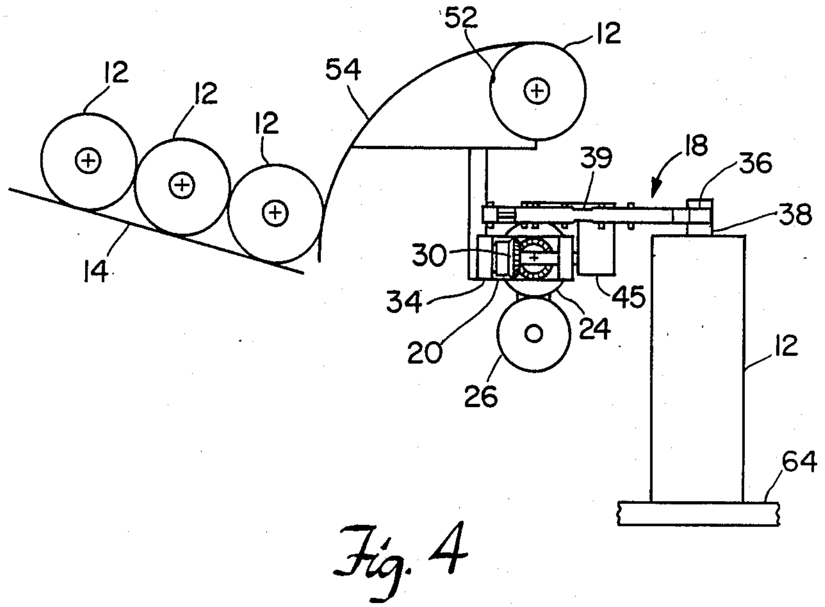
FIG. 4 is a diagrammatic front elevation of the FIG. 1 transport apparatus shown placing a container in a second container position.

Drive shaft 28 begins rotation to move container 12 from the first container position (FIG. 3) to the second container position (FIG. 4). As shaft 28 and gear 26 on its end rotate, gear 24 and drive member 20 are caused to rotate in a clockwise direction (FIG. 1) about the axis of shaft 22. As drive member 20 rotates, miter gear 30 is moved with respect to miter gear 29, causing extension 45 and the rest of gripper 18 to begin rotation with shaft 32. In FIG. 4, drive member 20 has been rotated by 90° about the axis of fixed shaft 22, and gripper 18 has been rotated by 90° about the rotating axis of shaft 32. Bottle 12 is thus dropped off in a vertical second container position on belt 64 for transport into a downstream oven (not shown). As gripper 18 rotates a printed bottle 12 to the second container position of FIG. 4, the next bottle 2 is moved by rotary feeder 16 into the first container position, where it is engaged by nose cone 56 and chuck 60.

Prior to drive shaft 28 being rotated in the opposite direction to return gripper 18 and drive member 20 to the FIG. 1 position for pickup of the next bottle 12, jaws 36 are retracted by movement of plunger 44 so that jaws 36 do not contact the bottle 12 that has been gripped by nose cone 56 and chuck 60. Shield 54 prevents the subsequent bottles 12 from moving off of chute 14.

Other Embodiments

Other embodiments of the invention are within the scope of the following claims.

Figure 5:
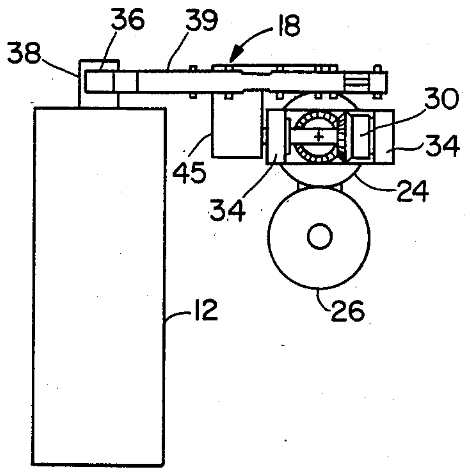
FIG. 5 is a diagrammatic front elevation of an alternative container transport apparatus shown engaging a container in a vertical engagement position.

For example, as shown in FIG. 5, the gripper and drive member components can be used to move unprinted bottles from a vertical infeed position to a horizontal print position 90° from the infeed position, and then move the printed bottles from the print position to a discharge position 90° from that.

Figures 6A, 6B, 6C, 6D, 6E:
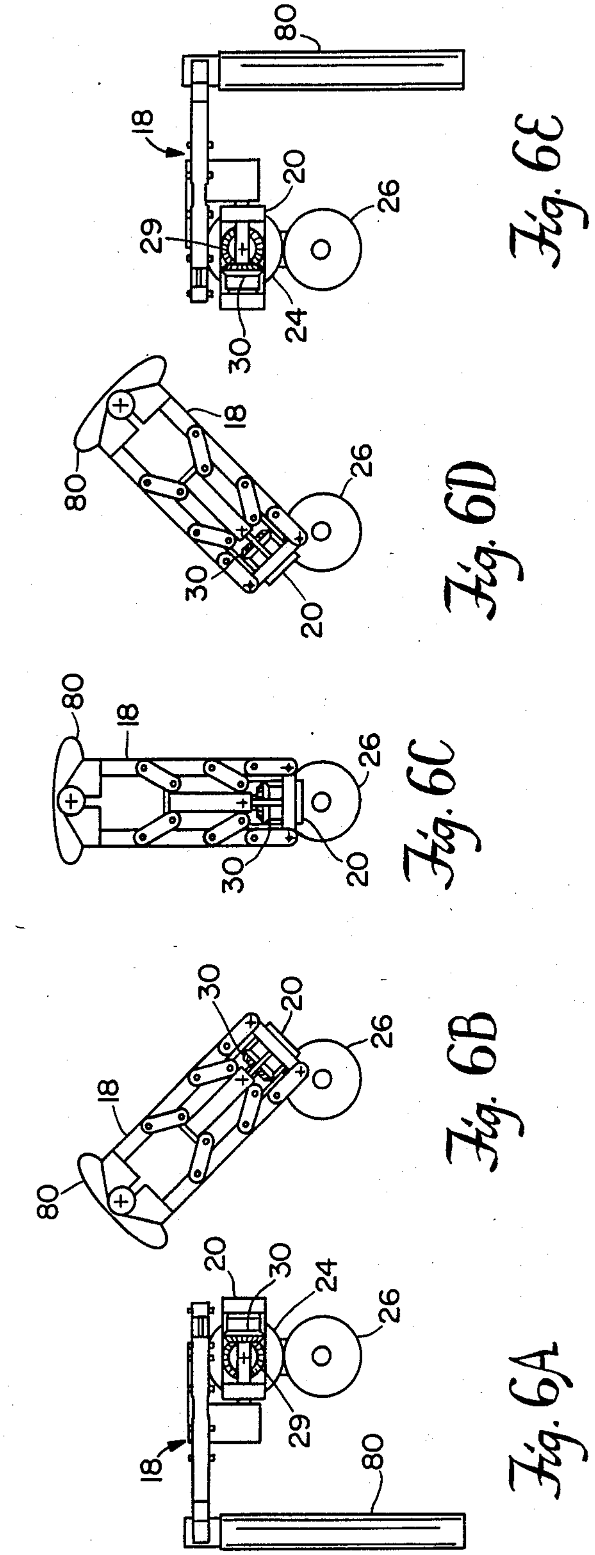
FIGS. 6A–6E are a series of diagrammatic front elevations illustrating a further embodiment of container transport apparatus in different positions.

Also, as shown in FIGS. 6A to 6E, the gripper and drive member components can be modified slightly for use with bottles 80 that do not have circular sections by making shaft 22 rotatable instead of fixed. Once again, bottles 80 are engaged in a vertical position, as shown in FIG. 6A. Shaft 28 is then rotated 45°, causing drive member 20 to rotate 45° in the opposite direction to the position shown in FIG. 6B. At the same time shaft 22 is rotated 45° in the same direction as shaft 28, causing 90° relative rotation between miter gear 29 and miter gear 30. This 90° relative rotation causes gripper 18, and thus bottle 80 on it, to be rotated 90° with respect to drive member 20 to the position shown in FIG. 6B.

Shaft 28 is then rotated 90° at the same time that shaft 22 is rotated 90° in the opposite direction, providing a zero net relative rotation of miter gears 28, 30. Gripper 18 and drive member 20 thus rotate 90° as an integral unit about the axis of shaft 22 through the positions of FIGS. 6B–6D. Extension 45 is mounted on shaft 32 at a location so that the axis of the radius of curvature of the upper surface of bottle 80 is at the axis of shaft 22. Printing stage 13 is moved linearly as the upper surface of bottle 80 is moved through its uppermost positions beginning at a position shortly before that of FIG. 6C and ending at a position shortly after that of FIG. 6C. Printing and ornamentation are applied during tangential contact of the upper surface of bottle 80 and the printing tray.

After reaching the position of FIG. 6D, shaft 28 is rotated 45° more in the same direction, and shaft 22 is rotated 45° in the same direction, causing 90° relative rotation between miter gear 29 and miter gear 30. This 90° relative rotation causes gripper 18, and thus bottle 80 on it, to be rotated 90° with respect to drive member 20 to the position shown in FIG. 6E.

What is claimed is:

1. Apparatus for moving a container from a first container position to a second container position in which said container is spaced from said first container position and in a different orientation, said apparatus comprising a drive member that is rotatable about a first axis between a first drive member position and a second drive member position, said first axis being spaced from said first container position, a gripper for gripping said container, said gripper being rotatably mounted on said drive member about a rotatable second axis that is transverse to said first axis and rotates with said drive member about said first axis, said gripper being rotatable about said rotatable second axis between a first gripper position and a second gripper position, and means for causing said gripper to rotate from said first gripper position to said second gripper position as said drive member rotates from said first driven member position to said second drive member position.

a container engaged by said gripper being in said first container position when said drive member and gripper are in their respective first positions and in said second container when said drive member and gripper are in their respective second positions.

2. The apparatus in claim 1 further comprising a printing stage for printing on said container when in said first container position.

3. The apparatus of claim 2 wherein said container is in a horizontal orientation when in said first container position and in a vertical orientation when in said second container position.

4. The apparatus of claim 1 further comprising a first primary gear that is connected to said drive member for rotation with said drive member and a second primary gear that drives said first primary gear to cause primary rotation of said drive member.

5. The apparatus of claim 1 wherein said means for causing comprises a first secondary gear that is connected to said gripper for rotation with said gripper and a second secondary gear that drives said first secondary gear to cause secondary rotation of said gripper with respect to said drive member.

6. The apparatus of claim 5 wherein said drive member is rotatable about a fixed shaft that carries said second secondary gear, said second secondary gear being fixed, said first secondary gear being mounted for rotation about said second axis as said gripper rotates about said first axis.

7. The apparatus of claim 6 wherein said secondary gears are miter gears.

8. The apparatus of claim 6 further comprising a first primary gear that is connected to said drive member for rotation with said drive member and a second primary gear that drives said first primary gear to cause primary rotation of said drive member.

9. The apparatus of claim 1 wherein said gripper includes jaws that move inward toward each other into an engaged position with said container and outward into a disengaged position.

10. The apparatus of claim 9 wherein said jaws are movable parallel to a third axis that is transverse to said first axis to avoid contact with a said container in said first container position as said gripper and drive member are being moved from their respective second positions to their respective first positions.

11. The apparatus of claim 10 wherein said jaws are carried by elongated outer members that have longitudinal axes and are connected to a central member of said gripper by two links for each outer member, each said link being pivotally connected at a pivotal connection at one end to a said outer member and at a pivotal connection at another end to said central member, the pivotal connections on said outer members being spaced from each other along said longitudinal axes so as to provide parallelogram linkages causing the outer members to be moved first outward and then inward into a container engagement position as said outer members are moved parallel to said longitudinal axes with respect to said central member.

12. The apparatus of claim 11 further comprising an actuator carried by said central member for moving said outer members parallel to said longitudinal axes with respect to said central member.

13. The apparatus of claim 12 wherein said actuator includes a plunger that moves with respect to said central member along an axis that is parallel to said longitudinal axes and pivotal links connecting said plunger to said outer members.

14. The apparatus of claim 13 wherein said actuator includes a pneumatic cylinder that drives said plunger.

15. The apparatus of claim 1 further comprising a container feeder attached to said drive member for rotation with it, said feeder moving a container from a pickup position to said first container position as said drive member moves from said first drive member position to said second drive member position.

16. The apparatus of claim 15 wherein said feeder includes a trough having a shape conforming to a surface of said container and apertures communicating with a vacuum source to provide engagement of said container.

17. The apparatus of claim 15 further comprising a delivery chute for delivery of said containers to said feeder, and wherein said feeder employs a curved shield having a radius of curvature about said first axis to block movement of said containers from said chute as said feeder moves a container from said pickup position to said first container position.

* * * * *

UNITED STATES PATENT AND TRADEMARK OFFICE
CERTIFICATE OF CORRECTION

PATENT NO. : 4,907,504

DATED : March 13, 1990

INVENTOR(S) : Kenneth R. Harris

It is certified that error appears in the above-identified patent and that said Letters Patent is hereby corrected as shown below:

Col. 1, line 36, add the word --often-- before the word "engage".

Col. 2, line 33, "Drawings" should be in all caps and centered on its own line.

Col. 2, line 66, insert --primary-- after "second" and before "gear 26".

Col. 3, line 31, "Operation" should be in all caps and centered on its own line.

Col. 3, line 68, "2" should be --12--.

Col. 4, line 11, "Other Embodiments" should be in all caps and larger type.

In the Claims:

Col. 5, line 14, insert --position-- after "container" and before "when".

Col. 6, line 44, insert --vacuum-- after "provide" and before "engagement".

Signed and Sealed this

Eighth Day of October, 1991

*Attest:*

HARRY F. MANBECK, JR.

*Attesting Officer*

*Commissioner of Patents and Trademarks*